L. C. IVES.
Improvement in Seed-Planters.
No. 130,920.                              Patented Aug. 27, 1872.
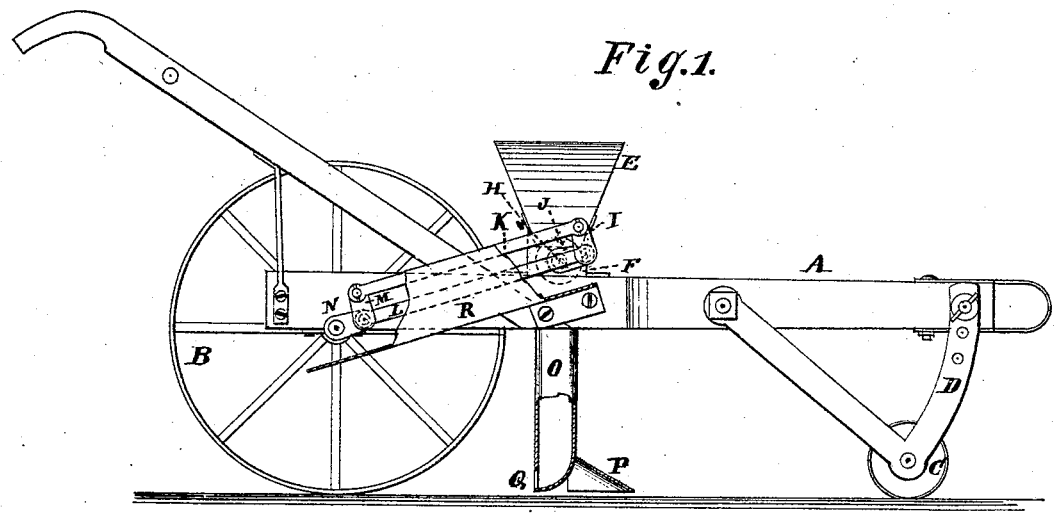
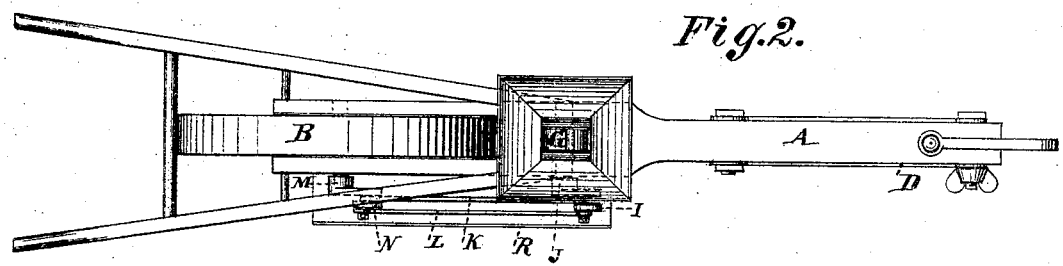

UNITED STATES PATENT OFFICE.

LUTHER C. IVES, OF LAND OF PROMISE, VIRGINIA.

IMPROVEMENT IN SEED-PLANTERS.

Specification forming part of Letters Patent No. 130,920, dated August 27, 1872.

Specification describing a new and useful Improvement in Walking Seed-Planters, invented by LUTHER C. IVES, of Land of Promise, in the county of Princess Anne and State of Virginia.

This invention relates to an improvement in walking seed-planters, which shall be simple in construction and more effective in operation than those heretofore constructed. The invention chiefly consists in the method of imparting a continuous rotary motion to a seed-distributing disk, through the medium of a combined transporting and covering wheel, and a system of double-crank shafts and connecting-rods, as will be hereinafter more fully described.

In the drawing, Figure 1 is a side elevation of the planter. Fig. 2 is a top view of the same.

A represents a beam, the rear end of which is bifurcated for the reception of a transporting-wheel, B, and to the front end of which is attached a gage-wheel, C, through the medium of an arc-shaped bar, D. E is the seed-receiving hopper, which is attached to the metallic casing F surrounding the discharge-opening in hopper and beam. G is a circular disk or hub, which is formed with a suitable number of cup-shaped depressions in its periphery for the reception and distribution of corn or seed. H is a horizontal shaft, journaled in the casing F, carrying the distributing-disk G, and provided also at one of its ends with double cranks I J. K and L are connecting-rods, attached to the cranks I J, and to similar double cranks M N formed on the axle of the wheel B. O is a tubular standard, of a square or other suitable shape, attached to the under side of the beam A by horizontal flanges, and having a plowshare, P, for opening the furrow, which is formed with its lower front portion. A discharge-opening, Q, is formed in the rear side of the standard for conducting the seed into the furrow. R represents a guard-plate or fender, which is bent into the form of a trough, and adapted to receive the cranks and connecting-rods for protecting the same from injury, and preventing the clogging of the same by weeds, clods, &c.

The operation and advantages of my planter are as follows, viz.:

The driving or transporting wheel B will be revolved by contact with the ground upon the advance of the planter, and thus transmit motion to the revolving distributing-disk through the medium of the double cranks and their respective connecting-rods.

The advantages attained by use of the double cranks and rods is the prevention of a dead-center in the revolution of the parts, which would be an unavoidable fact if only a single crank and rod were employed.

The seed-cups on the periphery of the disk may be one or more in number, and are situated at suitable distances apart to regulate the discharge of the seed into the furrow which is formed by the opening-share.

The transporting-wheel B, being situated in rear of the dropping mechanism and in line with the opening-plow, will enable the same to perform the function of covering the seed, and the periphery of said wheel may, in order to effectually accomplish said result, be made concave.

Having thus described my invention, what I claim as new, and desire to secure by Letters Patent, is—

The mechanism for operating the distributing-disk G, consisting of the double cranks I, J, M, and N, connecting-rods K L, and covering-wheel B, as herein shown and described.

LUTHER C. IVES.

Witnesses:
SOLON C. KEMON,
CHAS. A. PETTIT.